United States Patent [19]
Coley

[11] 3,729,763
[45] May 1, 1973

[54] WHEEL WASHING APPARATUS

[76] Inventor: Robert M. Coley, 609 Irwin Avenue, Ocilla, Ga. 31774

[22] Filed: Aug. 4, 1971

[21] Appl. No.: 168,867

[52] U.S. Cl. ................................................15/21 B
[51] Int. Cl. ..................................................B60s 3/04
[58] Field of Search ........................15/DIG. 2, 21 R, 15/21 B, 21 C, 21 D, 97; 214/340

[56] References Cited

UNITED STATES PATENTS

| 1,909,869 | 5/1933 | Randrup | 15/21 B |
| 2,718,650 | 9/1955 | Haverberg | 15/21 B |
| 2,797,006 | 6/1957 | Thompson | 15/DIG. 2 |
| 2,837,759 | 6/1958 | Haverberg | 15/DIG. 2 |

*Primary Examiner*—Edward L. Roberts
*Attorney*—Newton, Hopkins & Ormsby

[57] ABSTRACT

Wheel washing apparatus adapted to be associated with automatic car wash means for use in washing the outside surfaces of vehicle wheels, either prior to or after washing the vehicle body. The wheel washing apparatus includes a pair of laterally spaced wheel washing stations located on the apparatus and operatively associated with each other for contacting and washing the outside surfaces of vehicle wheels supported in position adjacent the station. Each of the wheel washing stations includes means for dispensing a cleansing medium on the vehicle wheels and means for effecting a scrubbing action of the wheels to effectively clean the wheels in a washing operation. Wheel supporting and rotating means is positioned adjacent each of the wheel washing stations for rotating the wheels to effect the scrubbing action on the wheels. The wheel supporting and rotating means includes a roller assembly supported adjacent each wheel washing station, with the roller assembly including a number of roller elements rotatable about substantially parallel axes with the axes of the roller elements being angularly disposed relative to the axis of the vehicle wheels for automatically centering the vehicle wheels between the laterally spaced wheel washing station in response to rotation of the roller support elements. The roller support elements include power drive means selectively operable between driving and non-driving conditions. The power drive means includes braking means which is applied automatically to hold the roller elements in a braked condition in response to movement of said power drive means to a non-driving condition.

23 Claims, 6 Drawing Figures

Patented May 1, 1973

INVENTOR
ROBERT M. COLEY

Newton, Hopkins, & Ormsby
ATTORNEYS

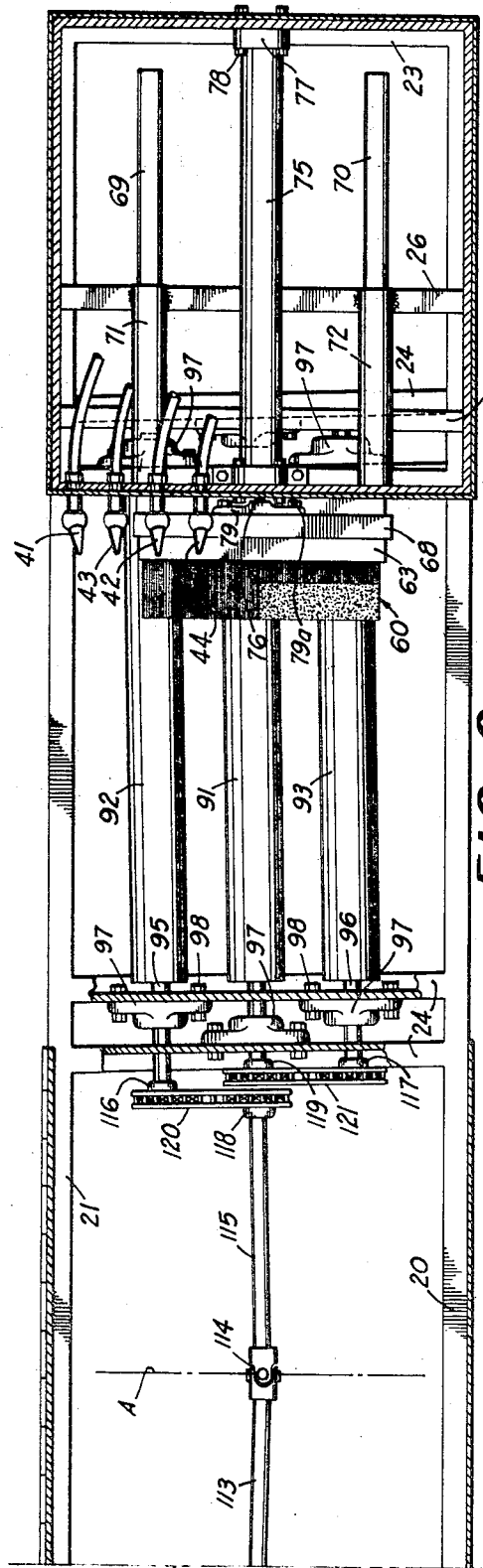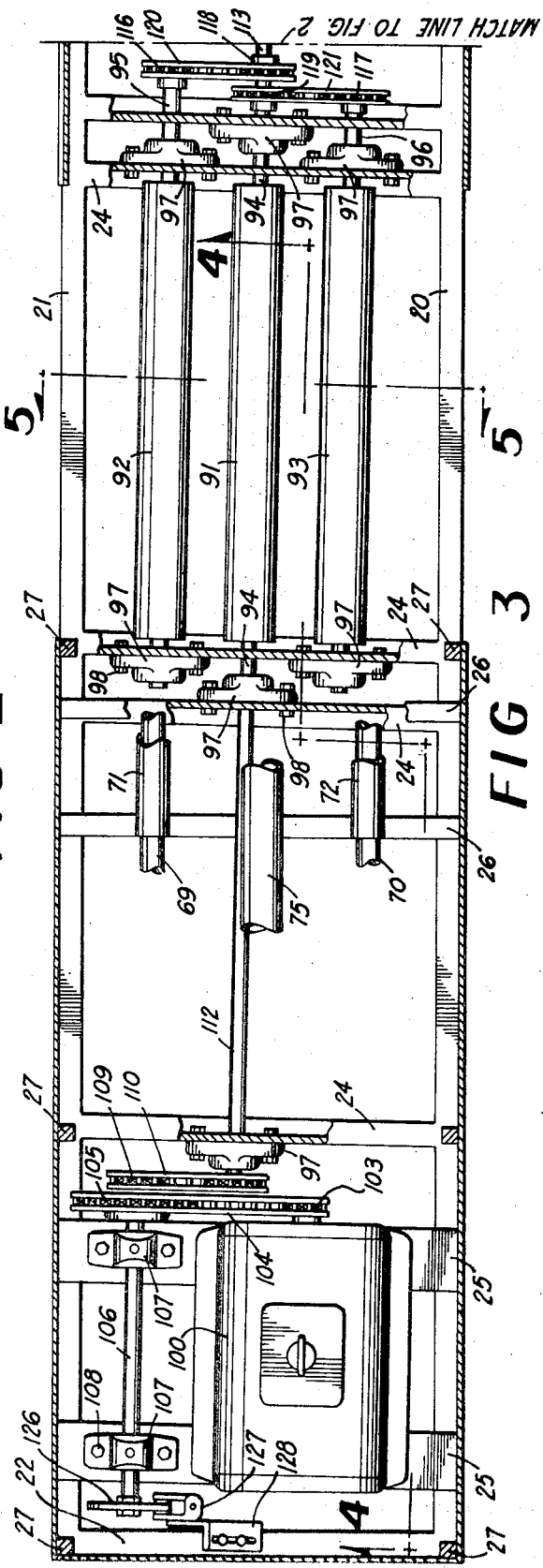

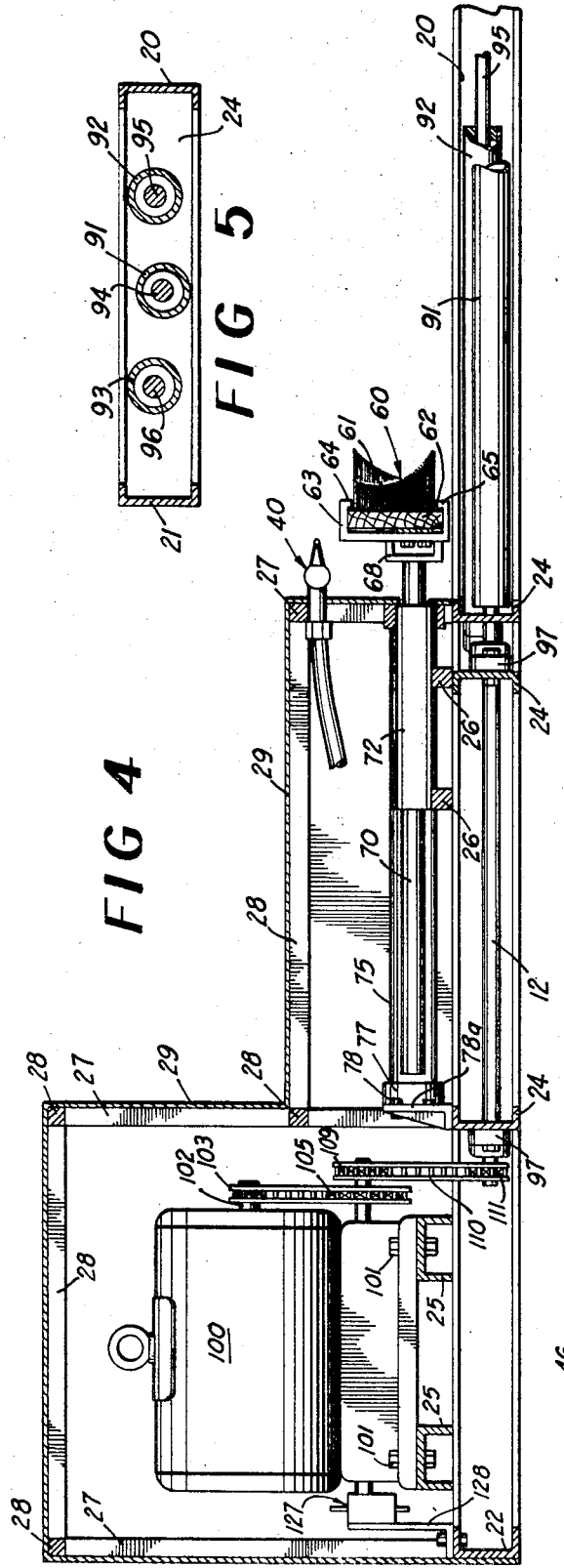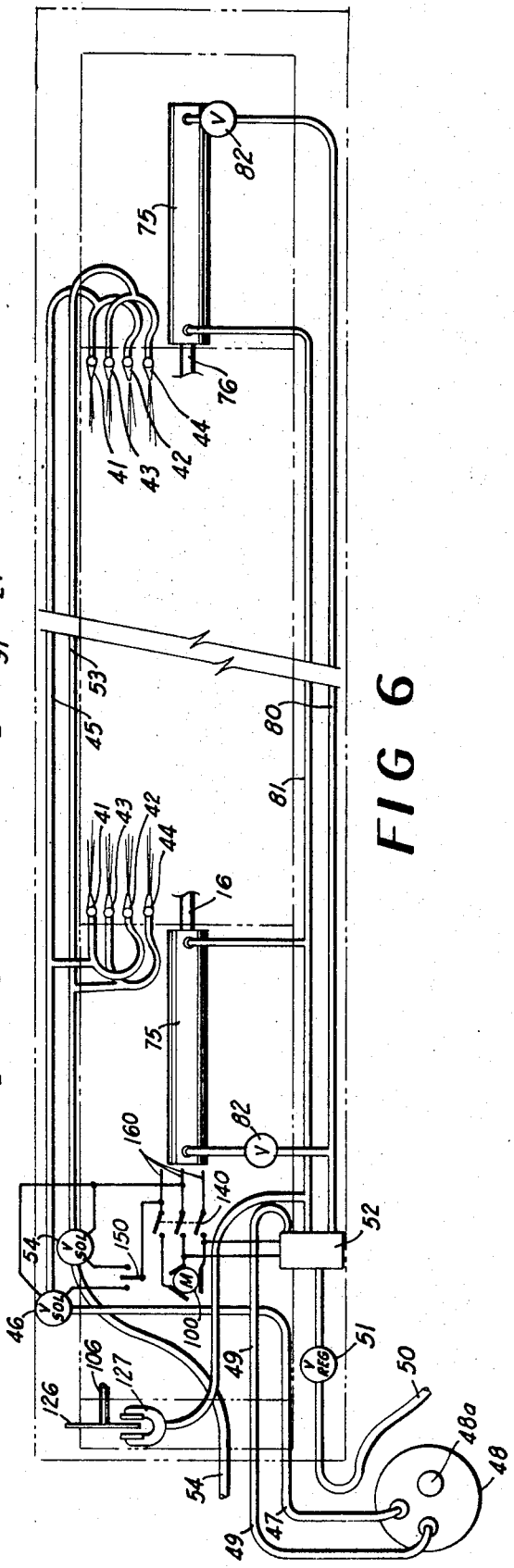

3,729,763

WHEEL WASHING APPARATUS

BACKGROUND OF THE INVENTION

This invention relates to apparatus for use in cleansing vehicle wheels. More particularly, this invention is directed to a wheel washing apparatus for use in conjunction with either automatic or semi-automatic vehicle body washing means, with the wheel washing apparatus being associated with the body washing means for use prior to or after a body washing operation.

With the considerable rise in labor costs, washing vehicles such as cars using hand labor has become extremely expensive. Further, washing of a car by hand is a slow process which requires one's car to be unavailable for use for a considerable period of time. Due to the increased cost of a hand washing operation and the considerable amount of time required, more and more facilities are being developed for automatically washing cars with mechanical apparatus which will require a minimum amount of labor and reduce the time to a minimum.

One type of automatic car wash includes a number of washing stations wherein the car is placed in a neutral driving condition and the car is towed through and adjacent the washing stations by conveyor means. In this type of automatic car wash, the vehicle wheels are steered in correct alignment with wheel bumper or curb elements. In some of these automatic car washes the wheels are washed by hand prior to passing through the automatic washing stations. In still other of these automatic car washes, an automatic wheel washing station is provided wherein the vehicle wheels are guided by the curb or bumper means onto a wheel supporting and rotating means for rotating the wheels as they are moved past a series of brushing means for scrubbing the wheels as cleansing fluid is introduced thereon.

Another type of automatic car wash includes a number of washing stations wherein the car is driven by the operator to each of the washing stations. In this type of car wash the vehicle is steered along a correct aligned position for washing by curb or wheel bumper means.

In still another type of automatic car wash the vehicle is maneuvered into a position by the operator adjacent automatic robot washing means and the vehicle is placed in park. After the vehicle is parked, an operator will energize automatic controls which will initiate movement of the robot washing apparatus around the vehicle body for effecting a washing operation of the vehicle in response to movement of the washing robot.

Due to the various dimensions of the wheel base of cars being washed, the prior art automatic wheel washing apparatus has required complex structural mechanisms for adjusting the wheel washing apparatus to accommodate these various vehicle wheel bases. This complex adjusting mechanism is expensive to manufacture, complex in operation and unreliable in performance.

In certain of the above mentioned automatic car washes, wherein a vehicle wheel bumper means or curb means is not provided for steering the wheels to a correct aligned position, the operator of the vehicle must be directed to a centrally aligned position in order to insure an effective wheel washing operation.

Another problem with some of the prior art wheel washing stations which are not provided with conveying means for conveying the vehicle past the wheel washing stations, results in movement of the vehicle off of the wheel washing apparatus after being washed. Due to rotation of the roller support elements for effecting rotation of the wheels in a washing operation, these roller elements do not provide sufficient traction to allow the vehicle to be driven off of the wheel washing apparatus without providing some means for braking or holding the roller support elements in a braked condition. The prior art braking means for holding the wheel supporting and rotating means in a braked condition have been extremely complex in construction resulting in unreliable performance of the braking apparatus.

SUMMARY OF THE INVENTION

The above disadvantages of the prior art automatic car washing apparatus including wheel washing means have been overcome by the present invention which basically includes a pair of laterally spaced wheel washing stations having wheel supporting and rotating means associated therewith wherein the wheel supporting and rotating means is operable for automatically centering the vehicle wheels between the wheel washing stations in response to rotation of the wheels. An important feature of the present invention includes the means for automatically applying a braking action to the wheel rotating means in response to stopping an input of power driving movement to the rotating means.

The vehicle wheel means is automatically centered relative to the wheel washing station by orienting the wheel support means for rotation about axes angularly disposed relative to the axis of the vehicle wheel.

Another important feature of the present invention includes the remote control station for controlling the dispensing of cleansing medium on the wheels and wherein the control means is automatically operable for effecting movement of wheel scrubbing brushes to a scrubbing position and for returning the scrubbing brushes to a non-scrubbing position in response to operation of selectively operable control means.

The wheel supporting and rotating means is operatively associated with movement of the brush between a wheel scrubbing position and a non-scrubbing position whereby movement of the brush to a non-scrubbing position will automatically apply the brakes to the rotatable wheel support means.

Still another important feature of this invention is the provision of a simple drive control system for effecting operation of the wheel rotating means.

An additional important feature of this invention includes a wheel washing apparatus which is simple in construction and operation, economical to manufacture and reliable in performance.

Still other objects and advantages of the details of construction of the present invention will become apparent upon reading the following description of the illustrative embodiment with reference to the attached drawings wherein like reference numerals have been used to refer to like parts throughout the several figures, and wherein:

BRIEF DESCRIPTION OF THE FIGURES OF DRAWING

FIGS. 2 and 3 are horizontal sectional plan views connectable along match lines A—A of the wheel washing apparatus shown in FIG. 1, with certain parts omitted and certain parts broken away and shown in section for purpose of clarity;

FIG. 4 is a vertical sectional view taken along line 4—4 of FIG. 3;

FIG. 5 is a vertical sectional view taken along line 5—5 of FIG. 3; and,

FIG. 6 is a schematic view showing the pneumatic and electrical control lines and detergent and water supply lines.

DESCRIPTION OF THE ILLUSTRATIVE EMBODIMENT

Figure 1:
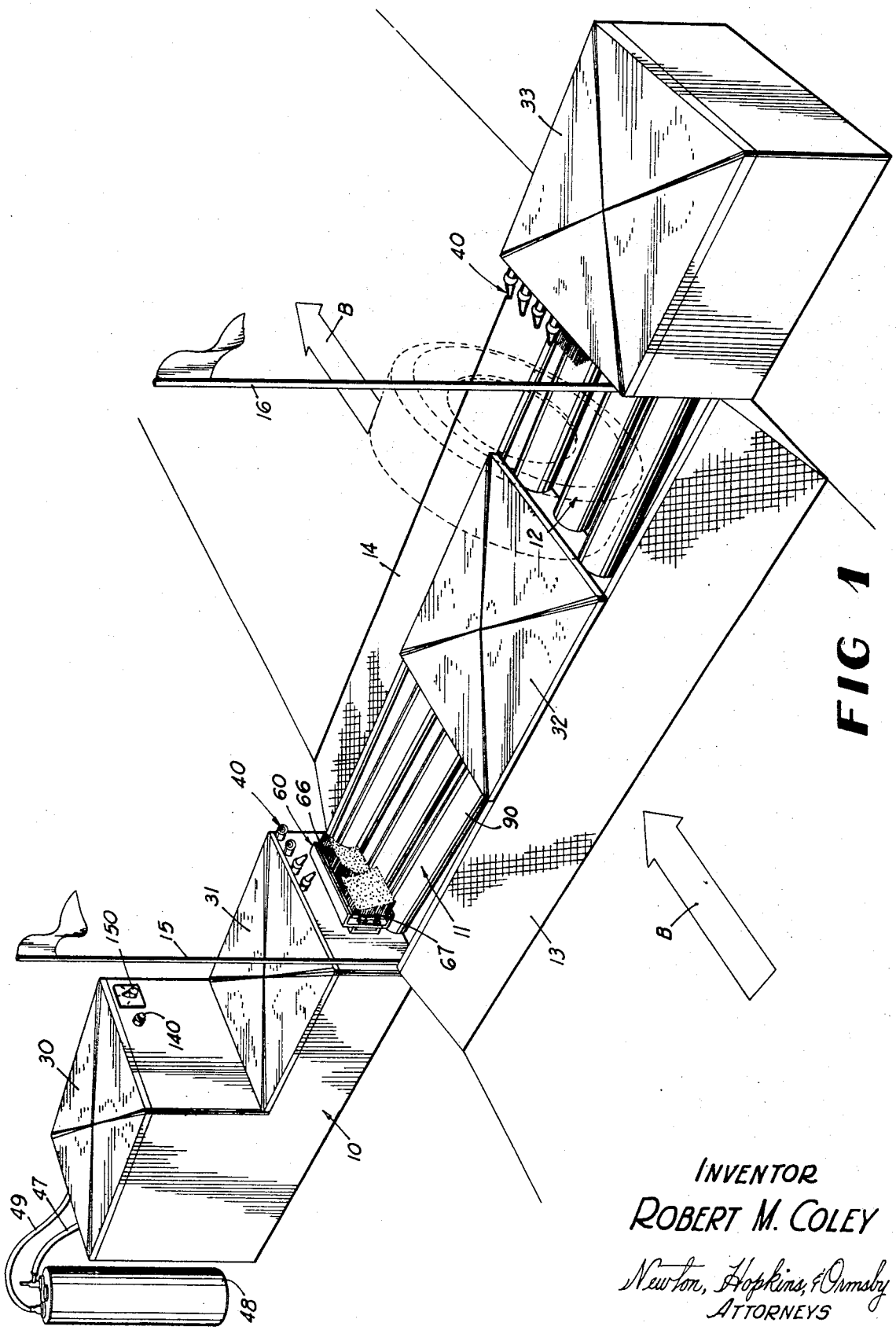
FIG. 1 is a perspective view of a wheel washing apparatus embodying the principles of the present invention, as seen from the right front looking in the direction of travel of a vehicle passing through the wheel washing apparatus.

Referring now to the drawings, the wheel washing apparatus embodying the principles of the present invention is generally represented by reference numeral 10 and includes a first wheel washing station 11 and a second wheel washing station 12. The wheel washing stations 11, 12 are laterally spaced relative to each other and aligned such that they will wash the outside surfaces of coaxially aligned vehicle wheels supported in position adjacent thereto. The wheel washing apparatus 10 includes ramp means 13, 14 for permitting a vehicle to be driven into position adjacent the wheel washing stations 11, 12. Even though ramp means 13, 14 are shown in FIG. 1, the wheel washing apparatus could be recessed relative to the supporting surface thereby rendering the ramp means 13, 14 unnecessary. As shown in FIG. 1, guide rod means 15, 16 are provided adjacent each of the wheel washing stations 11, 12, respectively, for guiding a vehicle operator in position on the wheel washing stations.

The wheel washing apparatus embodying the principles of the present invention will be described relative to supporting framework means 20, 21, etc; liquid dispensing means 40; vehicle wheel scrubbing means 60 and wheel support and rotating means 90.

The function of the structural framework means 20, 21, etc. is to provide rigid supporting means for supporting the liquid dispensing means 40, scrubbing means 60 and wheel supporting and rotating means 90 in operative position relative to each other.

The function of the dispensing means 40 is to provide means for dispensing a cleansing solution onto vehicle wheels in a wheel washing operation and to dispense a rinsing solution such as water onto the wheels for removing any detergent and dirt remaining thereon.

The function of the scrubbing means 60 is to provide means for contacting the outside surface of the wheels and effecting a scrubbing action of the wheels to effectively cleanse the outer surface of the wheels in a wheel washing operation.

The function of the wheel supporting and rotating means 90 is to provide means for supporting vehicle wheels adjacent a wheel washing station and for rotating the wheels relative to the dispensing means 40 and scrubbing means 60 whereby the dispensing means and scrubbing means will effectively contact all areas of the outside surface of vehicle wheels supported in position adjacent thereto.

Referring now particularly to FIGS. 2–5, the wheel washing apparatus frame support means includes a pair of elongated channel-shaped frame members 20, 21. The elongated channel-shaped members 20, 21 are vertically oriented with the channel of each of the members facing toward each other. Channel-shaped members 20, 21 are formed into a substantially rectangular base frame by a pair of end channel members 22, 23. End channel members 22, 23 are connected between the outer ends of channel members 20, 21. The base frame is provided with a number of intermediate vertically oriented cross connecting channel members 24. Intermediate channel members 24 will provide support means for bearings used in supporting the roller drive means as will be described in more detail hereinbelow.

As shown in FIGS. 3 and 4, the left end of the base frame is provided with a pair of horizontally oriented channel members 25. Channel members 25 are secured to the upper flange of channel members 20, 21, with the channel being directed downwardly. Channel members 25 will provide means for supporting the motor drive, as will be described in more detail hereinbelow. Also provided on the upper edge of the elongated channel members 20, 21, are a number of cross connecting tubular support members 26. Tubular support members 26 provide support for the brush scrubbing means 60 adjacent each of the wheel washing stations. The structural framework is provided with a number of vertically oriented tubular post elements 27 and a number of horizontally oriented tubular cross connecting members 28. The tubular posts 27 and horizontal connecting members 28 provide a supporting structure surrounding the internal working parts for supporting a suitable sheet metal housing 29. As shown in FIG. 1, the housing structure includes a removable top means 30 overlying the motor drive means, a removable top cover 31 overlying the brush actuating means of washing station 11, a top cover 32 overlying intermediate drive means between the wheel supporting and rotating means 90 and a suitable cover means 33 for overlying and protecting the operating mechanism of wheel washing station 12. The above described structural members 20, 21, etc. are of conventional metal stock construction with the connection points shown as being made by conventional welding means. However, it is to be noted that these members could also be connected by suitable removable bolt connecting means to permit the frame to be disassembled for shipment. The sheet metal housing 29 is attached to the structural framework by conventional sheet metal screws (not shown). The housing top members 30–33 are formed to provide upwardly sloping surfaces which will permit ready drainage therefrom.

As shown in FIGS. 1–5, the wheel washing stations 11, 12 are identical in the details of construction of the dispensing means 40, scrubbing means 60 and wheel supporting and rotating means 90. Therefore, the two wheel washing stations 11, 12 will be described concurrently with like reference numerals indicating corresponding parts of each of the wheel washing stations.

As shown in FIGS. 2 and 4, the dispensing means 40 includes a pair of detergent dispensing nozzles 41, 42 and a pair of water dispensing nozzles 43, 44. The dispensing nozzles 41-44 are horizontally spaced relative to each other with the detergent nozzles and water dispensing nozzles being alternated in longitudinal spacing and located directly beneath a horizontal cross connecting frame member 28. The dispensing nozzles are secured to the framework member 28 by conventional clamping means (not shown). The dispensing nozzles 41-44 are of conventional construction and are provided with an adjustable dispensing tip which will permit adjustment of the angle of the liquid medium being dispensed therefrom. Dispensing nozzles 40-44 are detailed in location for directing streams of detergent and rinsing water outwardly onto the outer surface of vehicle wheels supported in position adjacent thereto. As shown in FIG. 1, dispensing nozzles 40-41 are located relative to a forward edge of the wheel washing stations whereby the fluid dispensed therefrom will be directed from substantially the center or axis of the wheel outwardly along the outer surface of the wheel, with the dispensing fluid completely covering the outside surface of the wheel as the wheel is rotated during a wheel washing operation. The dispensing nozzles 40-41 are detailed in their spray pattern for effectively cleansing both the hub cap and the surface of the tire of vehicle wheel means.

As shown in FIG. 6, the detergent dispensing nozzles 41, 42 are provided with suitable supply conduit means 45 for delivering a supply of detergent under pressure to the dispensing nozzles 41, 42. The supply conduit means 45 is connected in flow communication with a conventional solenoid control valve means 46. Valve means 46 is provided with an input supply line 47. Input supply line 47 is connected in flow communication with suitable container means 48. The container means 48 is provided for containing a supply of cleansing detergent which will be directed through the supply line 47, solenoid valve 46, supply line 45 and outwardly through the dispensing nozzles 41, 42. Supply tank 48 is provided with a suitable opening 48a for permitting additional amounts of chemical detergents to be added when needed. The supply tank means 48 is connected by a pneumatic pressure line 49 to a valve control block 52. A conventional outside source of pneumatic pressure is delivered along an input supply line 50, through a pressure regulator 51, and to the conventional solenoid operated valve block 52. The description of operation of valve block 52 will be described hereinbelow in the description of the operation of the wheel washing apparatus.

As shown in FIG. 6, the water dispensing nozzles 43, 44 are provided with a supply of rinsing water through a supply conduit 53. Supply conduit 53 is connected in flow communication with a conventional solenoid operated valve means 54. A supply of water is furnished from conventional supply source (not shown) through an input supply line 55. Input supply line 55 is connected in flow communication with the solenoid control valve 54 whereby the water can be selectively directed through the supply line 53 and outward through the dispensing nozzles 43, 44.

Referring now particularly to FIGS. 1, 2 and 4, each of the wheel washing stations 11, 12 includes vehicle wheel scrubbing means generally represented by the reference numeral 60. The wheel scrubbing means includes a brush 61 having conventional outwardly directed bristles projecting from a supporting block 62. Supporting block 62 is removably mounted within a channel-shaped support member 53. Channel-shaped support member 63 includes coplanar inwardly directing lip portions 64, 65 which are adapted to engage edge portions of the brush block 62, to retain the brush in position when supported therein. The channel-shaped support member 63 includes a closed end 66 and an open end, as shown in FIG. 1. In an assembled position, the brush is slidably inserted within the support member 63 such that the brush mounting block 62 is engaged by the back surface and inwardly directing lips 64, 65 to maintain the brush in an operable position. A removable mounting plate 67 is secured in the open end of the support member 63 by suitably threaded connected bolt means (not shown). The removable mounting plate 67 can be removed whereby the brush can be slidably removed from the supporting member 63 and replaced with a new brush when needed. The vehicle wheel scrubbing brush 61 is supported for reciprocating movement from a retracted non-scrubbing position, as shown in FIGS. 1 and 4, to an extended scrubbing position with the brush bristles in contact with the surface of vehicle wheels supported adjacent thereto.

Brush 61 is supported for movement between the retracted and extended positions by means of a pair of elongated support rods 69, 70. Support rods 69, 70 are secured by conventional means, such as welding or threaded connecting bolt means (not shown) to a channel-shaped support member 68. Channel-shaped support member 68 is secured to the rear surface of the brush support member 63. Support rods 69, 70 are secured to the channel member 68 and extend therefrom in substantially parallel coplanar relationship. The support rods 69, 70 are supported for sliding movement by a pair of sleeve members 71, 72, respectively. Sleeves 71, 72 are provided with openings extending therethrough complementary to the outer surface of the support rods 69, 70. Sleeves 71, 72 are secured in a horizontally oriented parallel arranged position on the upper surface of cross connecting frame members 26. The sleeves are secured to the frame members 26 by conventional means such as welding (not shown).

Movement of the scrubbing brush 61 from the retracted position to the extended position is effected by a conventional pneumatic cylinder means 75. As shown in FIG. 2, the pneumatic cylinder 75 includes a conventional piston rod 76. The pneumatic cylinder 75 is provided with a base end 77 which is connected by suitable bolt connecting means 78 to a vertically extending frame member 78a. The extended end of the piston rod 76 is connected to a mounting bracket means 79. Mounting bracket means 79 is secured to the surface of channel member 68 by suitable connecting bolt means 79a. Reciprocating movement of the piston rod 76 within cylinder 75 is effected by means of conventional pneumatic pressure supplied to the cylinder means 75 by a cylinder expansion supply line 80 and a cylinder return or retraction supply line 81. As shown in FIG. 6, metering valves 82 are provided within supply line 80 for effecting controlled operation of pneumatic cylinder 75. The pneumatic supply lines 80, 81 are connected in flow communication with the valve block 52, whereby pneumatic pressure can be selectively introduced to either of the supply lines 80, 81 by operation of the solenoid control valve 52, which operation will be described in more detail hereinbelow.

Each of the wheel washing stations 11, 12 is provided with wheel supporting and rotating means whereby the vehicle wheel means can be supported adjacent the wheel washing stations and can be rotated allowing all areas of the outside surfaces of the vehicle wheel means to be advanced past the dispensing means 40 and the wheel scrubbing means 60. The wheel supporting and rotating means is generally represented by the reference numeral 90, with each of the wheel supporting and rotating means including an intermediate roller support element 91 and a pair of outer roller support elements 92, 93. Each of the roller elements 91–93 is provided with a supporting shaft 94, 95, 96, respectively, with the supporting shaft extending outwardly from each end of the roller and journaled in suitable bearing means 97. Bearings 97 for supporting roller shafts 95, 96 are connected by suitable bolt means to one cross connecting channel member 24 and the bearing 97 for supporting shaft 94, of the intermediate roller, is connected to a laterally spaced cross connecting channel-shaped support member 24. The reason for using two channel support members 24 is due to the horizontal spacing distance between the rollers 91–93 which would not permit all of the bearings 97 for the three shafts 94–96 to be supported on the same cross connecting frame member. Rollers 91–93 are so positioned that the axes of the rollers are substantially horizontally oriented relative to the supporting surface and the rollers are so located relative to the wheel washing stations that the rollers extend from a position beneath the brush scrubbing means to a position laterally spaced therefrom to provide a supporting area for a number of various dimensioned vehicle wheel bases.

As shown in FIGS. 1–3, the rotating roller support means 91–93 are supported on the supporting framework such that the axes of these rollers diverge outwardly from a center line A (FIG. 2) drawn between the wheel washing stations, in a direction of travel of a vehicle passing through the wheel washing stations. The axes of the roller support elements 91–93 are so positioned angularly that vehicle wheel means moved into position thereon will be automatically centered between the wheel washing stations 11, 12. The angular orientation of the roller support elements will automatically move the vehicle wheel means to the left or to the right, as required, to automatically center the vehicle wheel means as indicated above.

As shown in FIG. 5, the outside roller support elements 92, 93 are vertically spaced slightly above the intermediate roller support element 91 to provide an arcuate-shaped supporting surface which will be substantially complementary to vehicle wheel means being supported. The roller support elements 91–93 are all driven in a clockwise direction of rotation, as shown in FIG. 1, whereby a corresponding clockwise rotation of the wheel means will be effected to advance the wheels past the scrubbing and dispenser means. Rotation of the roller support elements 91–93 is effected by means of a conventional electric motor means 100. The motor means 100 is supported on the pair of cross connecting channel members 25 by a number of conventional threaded connecting bolt means 101. The motor support means 25 is provided with elongated slot means (not shown) whereby the motor can be adjusted relative to the support members to allow the drive means to be adjusted as needed. Motor 100 is provided with a conventional drive shaft means 102. The extended end of motor shaft 102 is provided with a conventional sprocket 103. Drive from sprocket 103 is delivered by a conventional chain means 104 to a coplanar aligned sprocket 105. Sprocket 105 is fixed to a control shaft 106 whereby rotation of the motor shaft 102 will effect corresponding rotation of the control shaft 106. Control shaft 106 is journaled in suitable bearing means 107. Bearings 107 are secured to the upper surface of the cross connecting channel members 25 by connecting bolt means 108. The control shaft 106 is provided with an end portion extending axially outward from sprocket 105. A sprocket 109 is fixed to the extended end of shaft 106 adjacent to sprocket 105 and drive is delivered therefrom by chain means 110 to a coplanar aligned sprocket 111. Sprocket 111 is fixed to a leftward extended end of shaft extension 112, as shown in FIG. 3. Shaft extension 112 is formed integrally with the support shaft 94 of the intermediate roller 91. Intermediate roller shaft 94 is provided with a second rightward shaft extension 113 which is connected to a conventional universal connecting element 114. Universal connecting element 114 is connected through to shaft extension 115 which is integrally formed with shaft 94 of the opposite intermediate roller support element 91.

The universal connection 114 will permit a drive to be delivered from the angle shaft extension 113 of intermediate roller support 94 of wheel washing station 11 to the angle drive shaft extension 115 of the intermediate roller support shaft of wheel washing station 12. As shown in FIG. 2, the axes of shafts 113, 115 extend at an angle outwardly from the center line A aligned with the universal connecting member 114. The axes of the shafts 113, 115 diverge outwardly from the center line A drawn through the universal joint, looking in the direction of arrow B shown on FIG. 2.

As shown in FIG. 2, a drive is delivered from the intermediate roller support shaft to the two outer roller support shafts 95, 96 by suitable chain and sprocket drive means. Roller support shafts 95, 96 are provided with extended ends projecting through suitable openings (not shown) in the cross connecting channel member 24. Conventional sprockets 116, 117 are fixed to the extended end of shafts 95, 96 and are coplanar aligned with respective sprockets 118, 119 fixed to the intermediate roller drive shaft 94. Conventional chain members 120, 121 are connected around sprockets 117, 118 and sprockets 119 and 120, respectively, whereby rotation of the intermediate roller support shaft 94 will effect corresponding rotation of the outer roller support shafts 95, 96.

After a wheel washing operation has been performed, the roller support elements 91–93 must be braked against rotation in order to allow vehicle driving wheel means to be driven off of the wheel washing apparatus. As shown in FIG. 3, a braking means 125 is operatively associated with control shaft 106, whereby suitable braking action can be applied thereto after a wheel washing operation, to provide suitable traction for propelling the vehicle drive wheels off of the wheel washing apparatus. The braking means 125 includes a conventional disc brake element 126 secured to the left extended end of control shaft 106 (FIG. 3). A conventional pneumatic control brake assembly 127 is operatively associated with the brake disc 126. The pneumatic control brake assembly 127 includes conventional pneumatically operated braking elements operable for applying a braking action to disc brake element 126. The braking assembly 127 is supported in position adjacent a brake disc element 126 by support bracket 128. Support bracket 128 is secured by conventional bolt connecting means to the upper flange of end channel member 122, as shown in FIGS. 3 and 4. As shown in FIG. 6, the pneumatic control brake assembly 127 is provided with a pneumatic supply line 129 which is connected in flow communication with the supply line 81 of the pneumatic cylinder 75, whereby the brake means 127 will be automatically applied in response to movement of the brushing means 60 to the retracted position. The operation of the brake control means and the brush control means will be described in more detail hereinbelow in the description of the operation of the wheel washing apparatus.

OPERATION

Before a wheel washing operation can be performed, the water supply line 54 must be connected to a suitable water supply source, the electrical input supply line 160 must be connected to suitable electrical supply source, the pneumatic pressure supply line 50 must be connected to a suitable pneumatic compressor means and the pneumatic lines 47, 49 must be connected to the detergent supply tank 48. After the various supply lines indicated above have been properly connected, a wheel washing operation can be performed by driving a vehicle in the direction of Arrows B (FIG. 1) whereby the front wheels of the vehicle are located on the wheel supporting and rotating rollers 91-93, with one wheel located adjacent wheel washing station 11 and the other wheel located adjacent wheel washing station 12. After the front wheels of a vehicle are in place on the wheel supporting and rotating means 90, a wheel washing operation is initiated by closing a manual control switch 140. Closing of manual control switch 140 will allow current to flow from the input supply line 160 to effect rotation of motor 100. Operation of motor 100 will effect a drive of the supporting rollers 91, 92 and 93 in a clockwise direction as shown in FIG. 1. The drive from motor 100 to the rollers 91-93 is delivered in a manner as described hereinabove in the description of the motor and roller drive means.

Rotation of the wheel supporting and rotating rollers 91-93 in a clockwise direction will cause the vehicle to move either leftward or rightward until the vehicle is automatically centered between the wheel washing stations 11, 12, due to the angular relationship of the axes of the rollers relative to the axis of the vehicle wheel means.

Closing switch 140 will effect operation of solenoid controlled valve block 52 to allow a supply of pneumatic pressure to flow along supply conduit 80, through metering valves 82 and into the pneumatic cylinders 75. Movement of pneumatic pressure into cylinder 75 will operate to extend piston rods 76 to their extended position, thereby moving the brushes 61 outwardly into contact with the outer surface of the vehicle wheel means. The metering valves 82 will operate to allow the pneumatic cylinder 75 to apply a continuous predetermined amount of pressure against the surface of vehicle wheel means. The pneumatic pressure from valve block 52 will flow along supply line 49 into the detergent tank 48 to thereby develop a predetermined amount of pressure within the tank.

After the vehicle wheel means have been properly centered and the brush means have been moved into contact therewith, the dispensing control switch means 150 is moved counterclockwise (as shown in FIG. 6) to complete the circuitry between the input power supply line 160 and solenoid control valve means 46. Energization of solenoid means (not shown) operatively associated with the valve 46 will allow a supply of chemical detergent to pass from the high pressure supply line 47 through the valve block 46 outward along supply conduit means 45, to be dispensed through the dispensing nozzles 41, 42. Switch means 150 is maintained in a detergent dispensing position for a predetermined period of time, after which switch means 150 is moved from a detergent dispensing position, clockwise to a detergent off position, and thereafter by clockwise movement to a water dispensing or rinsing on position. Movement of the switch means 150 to a clockwise limit position will complete the circuitry between input power supply means 160 to the solenoid control valve means 54. Operation of solenoid control valve means 54 will allow a supply of rinsing water to flow from supply conduit means 54 outward along supply conduit means 53 and through the dispensing nozzles 43, 44. The vehicle wheel means are continuously rotated in a clockwise direction, as shown in FIG. 1, during both the detergent dispensing and water dispensing operations.

After the vehicle front wheel means have been effectively cleaned in a manner as described above, the dispensing switch means 150 is moved to a central off position and the motor control and drive switch means 140 is moved to an off position. Movement of the switch means 140 to an off position will stop operation of the motor drive means 100 and will deenergize solenoid means operatively associated with the valve block 52 allowing conventional spring means to shift the valve mechanism whereby pneumatic pressure will be directed outwardly along pressure supply line 81 and into the pneumatic cylinder means 75 to retract piston rods 76 and move the scrubbing brushes 61 away from the vehicle wheel means. Simultaneously with the flow of pneumatic pressure for retracting the piston rod and brush means, the pneumatic pressure will flow along supply line 129 to the brake assembly means 127 to thereby apply a braking action to a disc brake element 126 for holding the rollers 91-93 in a braked position.

After the vehicle front wheel means have been effectively cleansed and the brushes have been moved to a retracted position, the vehicle is driven forward until the rear wheels are in position on the roller support elements 91-93. With the vehicle rear wheel means in position on rollers 91-93, the vehicle drive is placed in a neutral position which will permit the rear wheels to be freely driven by the rollers 91–93. After the vehicle rear wheel means are located in position on rollers 91–93, a wheel washing operation of the rear wheels is begun by closing switch 140. Closing of switch 140 will energize motor 100 to again drive the roller elements 91–93 in a clockwise direction as shown in FIG. 1. The initial rotation of rollers 91–93 will automatically effect a centering of the vehicle wheel means relative to the wheel washing stations, in a manner as described hereinabove. Simultaneously with the centering of the vehicle wheel means, the brush scrubbing means 61 will be moved outward to an extended operable scrubbing position by energization of the solenoid control valve block 52, allowing the pneumatic pressure to flow along supply line 80 through metering valves 82 and into pneumatic cylinder 75. With the vehicle rear wheel means being rotated in position and centered relative to the wheel washing stations 11, 12, a washing of the rear wheels is initiated and completed in the same manner as described hereinabove in regard to the washing of the vehicle front wheel means.

After the wheel washing operation of the vehicle rear wheel means has been completed, and the motor switch means 140 is moved to an off position allowing operation of the brake element 127, the brake will hold or apply a sufficient braking action to roller elements 91–93 to permit the vehicle rear driving wheel means to have sufficient traction for propelling the vehicle forward off of the wheel washing apparatus.

The above described embodiment of the wheel washing apparatus has been described showing the roller support elements having one angular orientation relative to the path of travel of vehicle wheels passing therethrough for automatically centering the vehicle wheel means relative to the wheel washing stations 11, 12. It is obvious that other angular orientation of the roller support elements could be provided which would also provide automatic centering of the vehicle wheel means.

The above described embodiment illustrates a detergent container means located externally of the wheel washing apparatus for containing predetermined amounts of liquid cleansing medium. However, it would be possible to provide an internal detergent container or tank means housed within the wheel washing apparatus.

It now becomes apparent that the above described illustrative embodiment of the wheel washing apparatus embodying the principles of the present invention is capable of obtaining the above stated objects and advantages. It is obvious that those skilled in the art may make modification in the details of construction without departing from the spirit of the invention which is to be limited only by the scope of the appended claims.

What is claimed is:

1. Vehicle wheel washing apparatus comprising, in combination:
    a. laterally spaced wheel washing stations positioned on said apparatus and operatively associated with each other for washing the outside surfaces of vehicle wheels supported in position adjacent said stations, said wheel washing stations including means for dispensing a cleansing medium on said vehicle wheels, and means for effecting a scrubbing action on said wheels; and,
    b. means on said apparatus for supporting and rotating vehicle wheels positioned adjacent said washing stations, said wheel supporting and rotating means operable for automatically centering vehicle wheels between said laterally spaced wheel washing stations.

2. Vehicle wheel washing apparatus as defined in claim 1 further characterized in that said wheel supporting and rotating means is operable for automatically centering said vehicle wheels in response to rotation of said wheel supporting means.

3. Vehicle wheel washing apparatus as defined in claim 2 further characterized in that said wheel supporting and rotating means includes a roller assembly located adjacent each wheel washing station, with said roller assembly including a number of roller elements rotatable about substantially parallel axes and positioned in vertical spacing relative to each other to support vehicle wheel means positioned thereon, and wherein at least one of said roller elements of said roller assembly is power driven for effecting rotation of said vehicle wheel means in a washing operation.

4. Vehicle wheel washing apparatus as described in claim 3 further characterized in that the rotatable axes of said wheel supporting roller elements are angularly disposed relative to the axis of said vehicle wheel means whereby rotation of said vehicle wheel means by said wheel supporting and rotating roller elements will effect said automatic centering of said vehicle wheels relative to said wheel washing stations.

5. Vehicle wheel washing apparatus as defined in claim 4 further characterized in that said rotatable wheel supporting roller elements are rotatable about substantially horizontally oriented axes with said roller element axes being angularly disposed relative to the axis of said vehicle wheels.

6. Vehicle wheel washing apparatus as defined in claim 5 further characterized in that said horizontally oriented angularly disposed axes of said rotatable elements diverge away from a center line drawn between said wheel washing stations in the direction of movement of vehicle means into position on said wheel washing apparatus.

7. Vehicle wheel washing apparatus as defined in claim 1 further characterized in that said wheel supporting and rotating means includes power driving means selectively operable between driving and non-driving conditions, and wherein said wheel supporting and rotating means includes braking means operatively associated with said power driving means and operable between braking and non-braking conditions and movable to said braking condition in response to movement of said power driving means to said non-driving condition.

8. Vehicle wheel washing apparatus comprising, in combination:
    a. laterally spaced wheel washing stations positioned on said apparatus and operatively associated with each other for washing the outside surfaces of vehicle wheels supported in position adjacent said stations, said wheel washing stations including means for dispensing a cleansing medium on said vehicle wheels and means for effecting a scrubbing action on said wheels; and, b. means on said apparatus for supporting and rotating vehicle wheels positioned adjacent said washing stations, said wheel supporting and rotating means includes power driving means selectively operable between driving and non-driving conditions for effecting rotation of said wheel supporting and rotating means, and wherein said wheel supporting and rotating means includes braking means operable between braking and non-braking conditions, said braking means being operatively associated with said power driving means for movement to said braking condition in response to movement of said power driving to said non-driving condition.

9. Vehicle wheel washing apparatus as defined in claim 8 further characterized in that said power driving means includes an operable control shaft, with power motor means operatively associated with said control shaft for effecting rotation of said control shaft in response to operation of said power motor means in said driving condition and wherein said braking means is operatively associated with said control shaft for applying a braking action to said control shaft in response to operation of said power motor means in said non-driving condition.

10. Vehicle wheel washing apparatus as defined in claim 8 further characterized in that said wheel supporting and rotating means is operable for automatically centering said vehicle wheels between said washing stations in response to rotation of said wheel supporting means.

11. Vehicle wheel washing apparatus as defined in claim 10 further characterized in that said wheel supporting and rotating means includes a roller assembly located adjacent each wheel washing station, with said roller assembly including a number of roller elements rotatable about substantially parallel axis and positioned in vertical spacing relative to each other to support vehicle wheel means positioned thereon, and wherein at least one of said roller elements of a roller assembly is power driven for effecting rotation of said vehicle wheel means in a washing operation.

12. Vehicle wheel washing apparatus as described in claim 11 further characterized in that the rotatable axes of said wheel supporting roller elements are angularly disposed relative to the axis of said vehicle wheel means whereby rotation of said vehicle wheel means by said wheel supporting and rotating roller elements will effect said automatic centering of said vehicle means relative to said wheel washing stations.

13. Vehicle wheel washing apparatus as defined in claim 12 further characterized in that said rotatable wheel supporting roller elements are rotatable about substantially horizontally oriented axes with said roller element axes being angularly disposed relative to the axis of said vehicle wheel means.

14. Vehicle wheel washing apparatus as defined in claim 13 further characterized in that said horizontally oriented angularly disposed axes of said rotatable elements converge toward a center line drawn between said wheel washing station in a direction opposite movement of vehicle means into position on said wheel washing apparatus.

15. Vehicle wheel washing apparatus comprising, in combination:

a. laterally spaced wheel washing stations positioned on said apparatus and operatively associated with each other for washing the outside surfaces of vehicle wheels supported in position adjacent said stations, said wheel washing station including means for dispensing a cleansing medium on said vehicle wheels, and means for effecting a scrubbing action on said wheels;

b. means on said apparatus for supporting and rotating vehicle wheels positioned adjacent said wheel washing station, said vehicle wheel supporting and rotating means including selectively operable power drive mean movable between driving and non-driving conditions; and, c. a control station operatively associated with said wheel washing stations and said wheel rotating means, said control station including selectively movable switch means operatively associated with said wheel rotating means for controlling operation of said wheel rotating means between said driving and non-driving conditions, said control station including additional switch means operatively associated with said dispensing means and said wheel scrubbing means for effecting operation of said dispensing means and said wheel scrubbing means, said additional switch means being operable between an off position, a dispensing position and a wheel scrubbing position and wherein said dispensing means is in an off condition when said scrubbing means is in a scrubbing position and said scrubbing means is in an off position when said dispensing means is in an on position.

16. Vehicle wheel washing apparatus as defined in claim 15 further characterized in that said wheel supporting and rotating means is operable for automatically centering said vehicle wheels in response to rotation of said wheel supporting means.

17. Vehicle wheel washing apparatus as defined in claim 16 further characterized in that said wheel supporting and rotating means includes a roller assembly located adjacent each wheel washing station, with said roller assembly including a number of roller elements rotatable about substantially parallel axes and positioned relative to each other to support vehicle wheel means positioned thereon, and wherein at least one of said roller elements of a roller assembly is power driven for effecting rotation of said vehicle wheel means in a washing operation.

18. Vehicle wheel washing apparatus as described in claim 17 further characterized in that the rotatable axes of said wheel supporting roller elements are angularly disposed relative to the axes of said vehicle wheel means whereby rotation of said vehicle wheel means by said wheel supporting and rotating roller elements will effect said automatic centering of said vehicle means relative to said wheel washing stations.

19. Vehicle wheel washing apparatus as defined in claim 18 further characterized in that said rotatable wheel supporting roller elements are rotatable about substantially horizontally oriented axes with said roller element axes being angularly disposed relative to the axis of said vehicle wheel means.

20. Vehicle wheel washing apparatus as defined in claim 19 further characterized in that said horizontally oriented angularly disposed axes of said rotatable elements diverge away from a center line drawn between said wheel washing station in the direction of movement of vehicle means into position on said wheel washing apparatus.

21. Vehicle wheel washing apparatus as described in claim 15 further characterized in that said wheel supporting and rotating means includes selectively operable power driving means operable between driving and non-driving conditions, and wherein said wheel supporting and rotating means includes braking means operatively associated with said power driving means and operable between braking and non-braking conditions and movable to said braking condition in response to movement of said power driving means to said non-driving condition.

22. Vehicle wheel washing apparatus as defined in claim 21 further characterized in that said power driving means includes an operable control shaft, with power motor means operatively associated with said control shaft for effecting rotation of said control shaft in response to operation of said power motor means in said driving condition and wherein said braking means is operatively associated with said control shaft for applying a braking action to said control shaft in response to operation of said power motor means to said non-driving condition.

23. Vehicle wheel washing apparatus as described in claim 22 further characterized in that said control shaft is adjustable relative to said power driven motor means and wherein said braking means includes mounting means for maintaining said braking means in aligned position relative to said control shaft in response to adjustment of said control shaft relative to said power driven motor means.

* * * * *